United States Patent [19]
Brezina

[11] Patent Number: 4,493,749
[45] Date of Patent: Jan. 15, 1985

[54] COMPOSITE VEHICLE FRAMES AND METHOD OF MANUFACTURING COMPOSITE VEHICLE FRAMES

[76] Inventor: David C. Brezina, 2035 W. Berwyn Ave., Chicago, Ill. 60625

[21] Appl. No.: 428,596

[22] Filed: Sep. 30, 1982

[51] Int. Cl.³ .............................................. B62K 3/04
[52] U.S. Cl. ................................. 156/187; 156/172; 156/195; 280/281 R
[58] Field of Search ........ 156/155, 184, 185, 187–188, 156/195, 171–173, 175, 190–192, 189; 428/109, 110, 107, 902; 280/281 R, 281 B; 273/73 F

[56] References Cited

U.S. PATENT DOCUMENTS

| 4,047,731 | 9/1977 | Van Auken | 428/36 X |
| 4,114,880 | 9/1978 | Cecka | 273/73 F X |
| 4,335,587 | 6/1982 | Thomamueller | 156/155 X |

Primary Examiner—David Simmons
Attorney, Agent, or Firm—Brezina & Buckingham

[57] ABSTRACT

My invention constitutes a new method of manufacture of vehicle frames utilizing a multiplicity of tubes wrapped with a resin impregnated fiber material.

3 Claims, 10 Drawing Figures

U.S. Patent  Jan. 15, 1985  Sheet 1 of 3  4,493,749
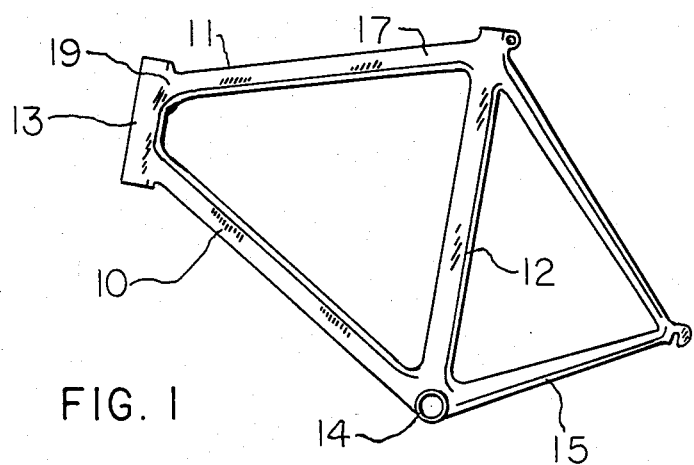
FIG. 1
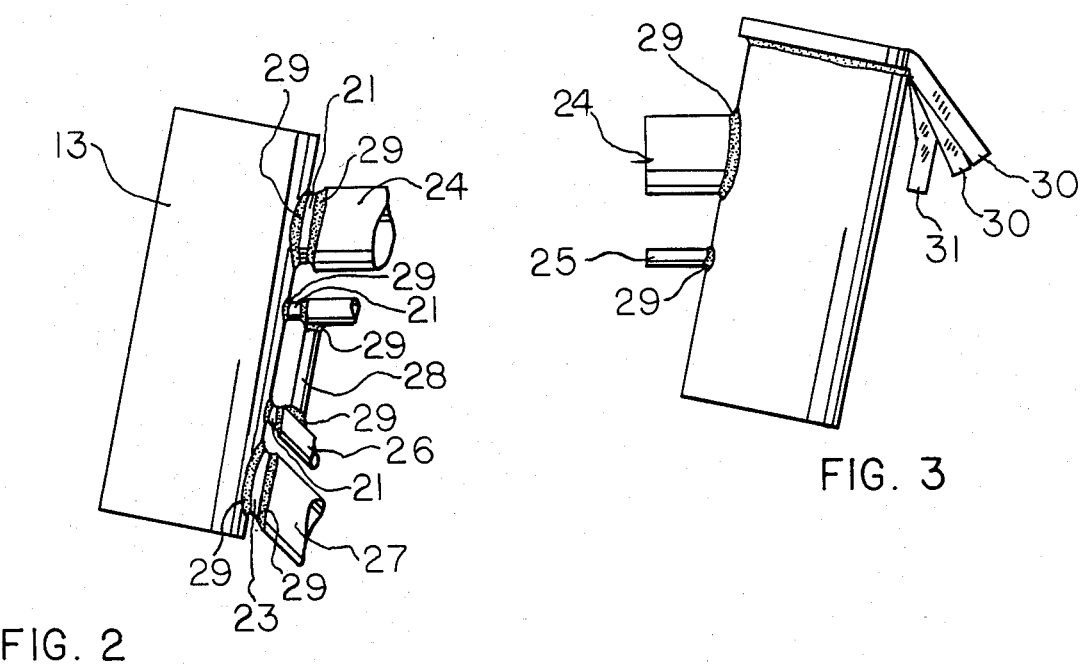
FIG. 2
FIG. 3
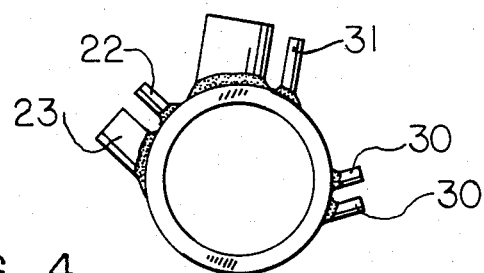
FIG. 4

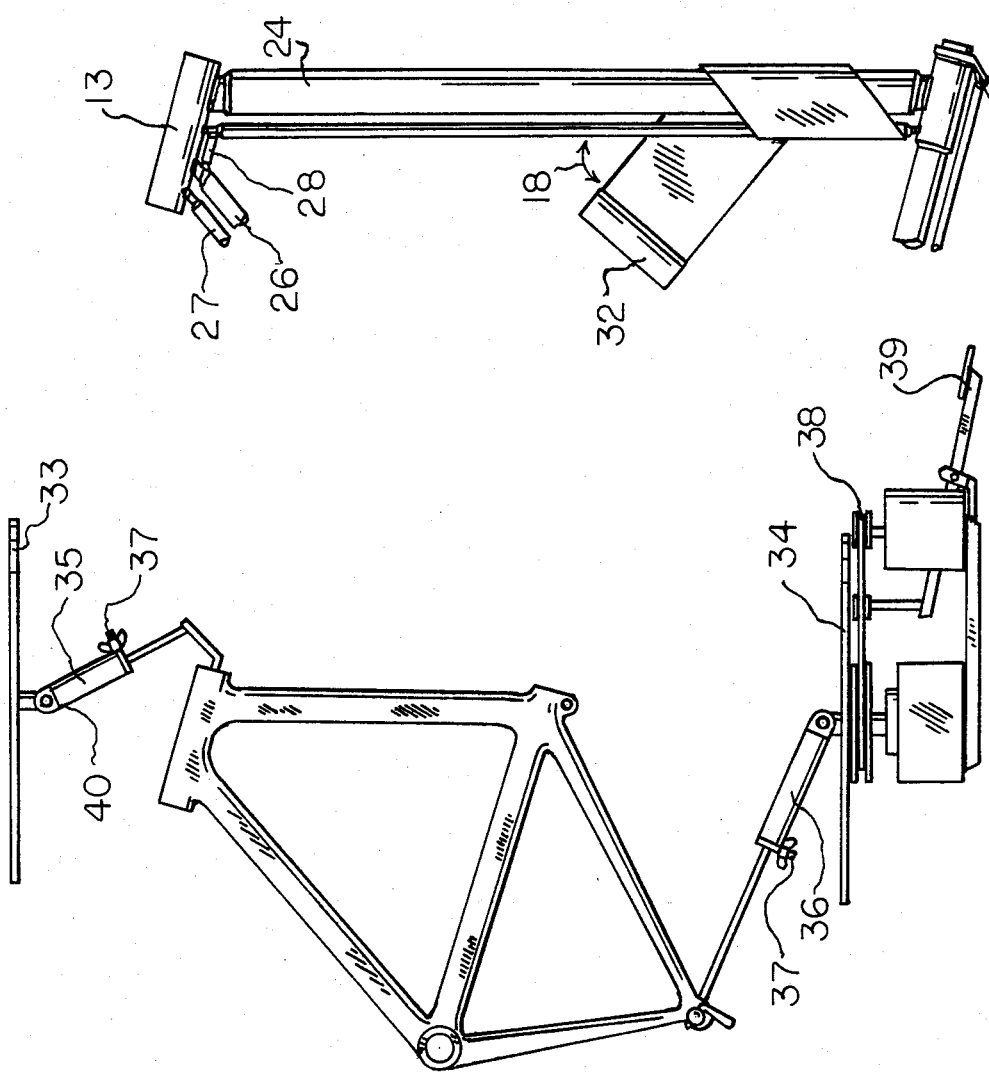
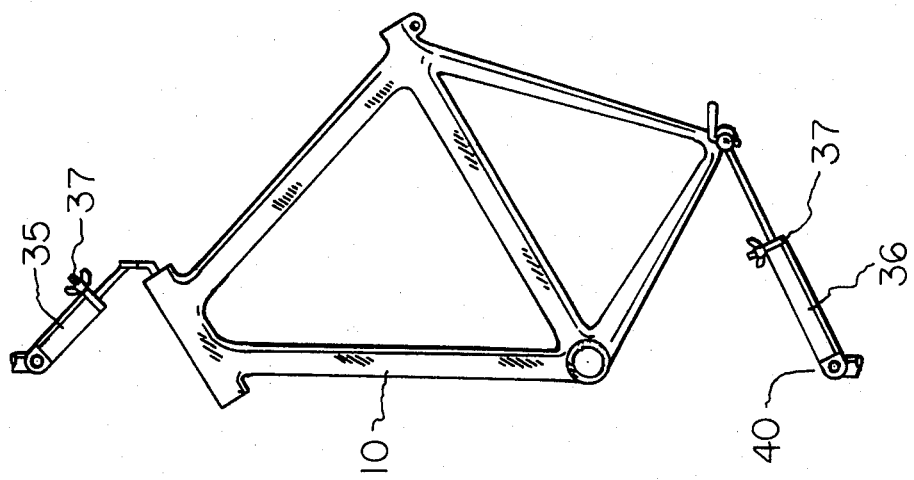

COMPOSITE VEHICLE FRAMES AND METHOD OF MANUFACTURING COMPOSITE VEHICLE FRAMES

DISCUSSION OF THE PRIOR ART

In the prior art both tubing structures and fiber reinforced resin materials are known. The invention combines the advantages of both. With respect to bicycle frames, or other vehicle frames, two general methods of manufacture are known, these being the completely welded structure and the lugged structure. Welded frames utilize minimal custom castings, being built up primarily from tubing stock. These have the disadvantage of a generally low strength for a given weight in structures utilizing relatively few tubes and relying upon individual tubing strength for overall strength, as in common diamond bicycle frames. In multiple tubing applications, as in aircraft or automobile space frames, the case of fabrication of this method overcomes the individual structure's strength to weight disadvantages.

Lugged frames utilize precision cast components at areas where high strength is needed, such as joints between tubes. This permits the use of lighter weight tubing of either a constant guage, or of variable guage butted tubing thicker at either end. These are commonly joined by brazing or soldering.

Fiber reinforced resin construction provides relatively high strength to weight. This construction has the disadvantage of relatively scarce availability of stock tubing or components. Fiber reinforced resin construction further frequently requires relatively complex processes for molding or forming. Tubing is commonly formed on shafts which are removed at the point of manufacture, or formed upon tubing dissolved from within the formed member as in an acid bath. Even should commercially made tubing be available, construction of vehicle frames would still be no less complex than methods of metal construction. The use of fibers reinforced resin tubing may also require relatively large dimensions for equivalent strength in the absence of multiple tube construction or external bracing. This relatively large size to strength disadvantage is also a problem in light alloy metal tubing and aluminum tubing. Where vehicle frame members are exposed to a fluid medium, as the vehicle moves through the medium, substantial drag can result from inefficient shapes. A reduction of aerodynamic drag as well as weight can be obtained utilizing my invention.

In order to avoid the use of either molds or bonding methods such as welding or soldering requiring high levels of skill, fiber-resin wrap is utilized to both bond frame structural members together, as well as add substantial structural strength and provide for efficient aerodynamic shape.

DETAILED DESCRIPTION OF THE DRAWINGS

FIG. 1 is a plan view of a frame in the preferred embodiment, suitable for use in a bicycle. Apparent are structural elements of a bicycle frame, the main tube, 10, top tube, 11, seat tube, 12, and head tube, 13. Also apparent are the crank hanger, 14, and chainstays, 15 and 16. FIG. 1 reveals the application of the outer skin, 17, in this embodiment at an angle of approximately 30°, 18, relative to the axis of the structural section. Also apparent is the continuous wrap of the outer skin around the junction between the components.

FIG. 2 is a plan view of the head tube junction with the main structural, 20, and reinforcing, 21, top tube mountings and the main structural, 23, and reinforcment, 22, mountings apparent. The structural and reinforcing tubes are also apparent at 24-27. The head tube reinforcement, 28, is bonded across the reinforcing tubes. All joints are bonded at 29.

FIG. 3 is a plan view of the seat tube—head tube junction with the respective tube mountings apparent 24 and 25, and the chainstay, 30, and seat tube, 31, reinforcement mountings.

FIG. 4 is a plan view of the crank hanger.

FIG. 5 is a plan view showing the structural tubes, 24-28, and the application of the outer skin of a roll of fiber reinforced plastic material in its uncured form, 32.

FIG. 6 shows the vertically oriented rotatable jig with its upper, 33, and lower, 34, supports, telescoping, upper, 35, and lower, 36, links with their adjustments, 37. A drive mechanism, 38, and control, 39, also are shown.

FIG. 7 shows the jig links having been reoriented so that the main tube, 10, is at the vertical axis, 40.

DISCLOSURE

Figure 8:
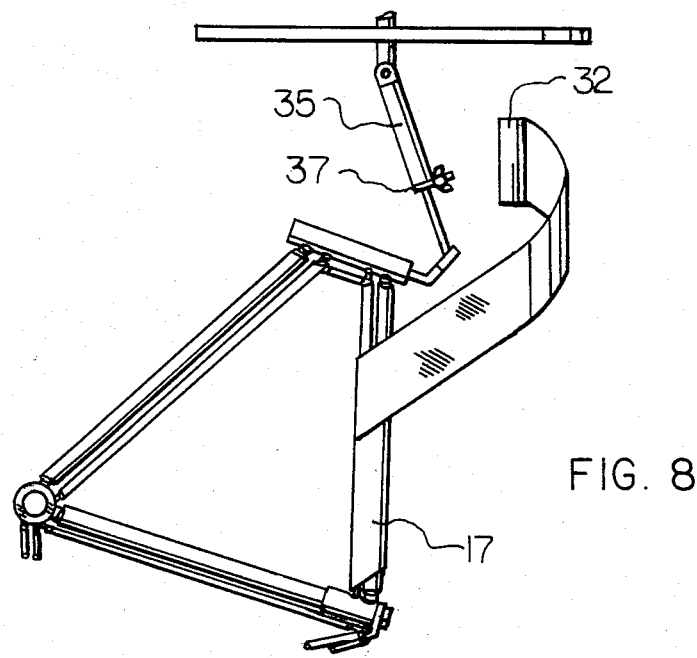
FIG. 8 shows the process of wrapping the outer skin around the sub-frame, while fitted in the jig.
Figure 9:
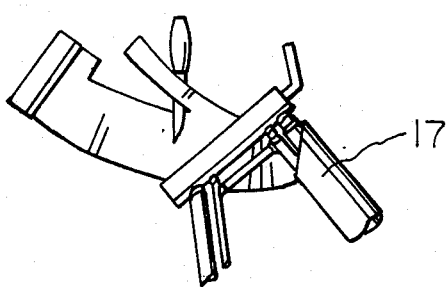
FIG. 9 shows the process of longitudinally splitting the sheet.
Figure 10:
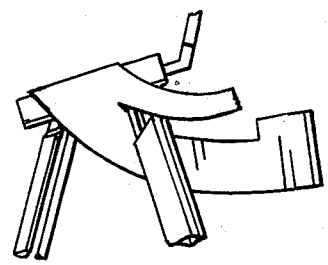
FIG. 10 shows the continuous wrapping of the sheet around a joint.

The initial step in construction is to construct a main frame utilizing relatively larger tubing affixed to critical component mounting structures. Component structures in a bicycle include the head tube, crank hanger, seat post lock ring, chainstay supports and rear dropouts. The main frame is then reinforced with tubing of substantially lesser diameter along the bottom of the top tube, the rearward and upward axis of the main tube and the rear axis of the seat tube.

The overall finished diameter of bicycle chainstays must be kept to a minimum in order to provide adequate clearance for the rear wheel and drivetrain. Accordingly, two or three small diameter tubes are mounted in close proximity to one another. These units are used to construct each of the right and left, upper and lower chainstays.

Finally, double or triple small diameter tubing may be used to construct the right and left arms of the front fork. Ideally, a triple tube fork arm would use front and rear outer tubes affixed at their upper ends to a machined or cast fork crown, with a third tube centrally and inboardly located so as to provide additional structural support and lateral stiffness.

The critical area in assuring structural strength in a diamond type bicycle frame, or in any tubular vehicle space frame, is at the junction of the tubes. Customarily this is accomplished through precision fitting of joints using either lugs or sufficiently large guage tubing. My invention utilizes non-precision fittings and a simple bonding method whereby sufficient structural strength is provided for construction, while the wrapping with resin impregnated fiber contributes the additional necessary strength and rigidity for use. Two relatively unskilled steps, therefore, provide a substitue for and strength and weight advantage over the prior art.

Specific fittings can be fabricated using predominantly stock tubing and plate. In the bicycle frame embodiment, dropouts and seat post clamp can be fabricated from ¼ inch aluminum plate. Minor bending of dropout—chainstay junctions (approximately ½°–4°), and bending the seat post clamp 180° around a radius of approximately 10–15 mm, are the only operations necessary, in addition to cutting and drilling as necessary.

In the bicycle frame embodiment, both the head tube and crank hanger fittings are fabricated from tubing of substantially larger diameter tubing than the main tubing. The dimensions of said head tube and crank hanger tubing are selected primarily on the basis of their suitability for the tapping for fitment of standard bearing race components. These fittings require the affixation of engagement members for the top tube and main tube and the main tube and seat post, respectively, These engagement means can be fabricated from tubing of an outside diameter incrementally less than the inside diameter of the structural tubing with which engagement is to be made. Said engagement means should be affixed in approximately equally angular disposition relative to and in substantially the same plane as the longitudinal axis of the head tube, and perpendicular to and in a plane substantially perpendicular to the longitudinal axis of the crank hanger.

The affixation of the structural tubing mounting lugs can be accomplished in any manner which would yield a structure sufficiently rigid to maintain its shape while undergoing the application of the outer skin. Drilled and tapped fittings are inherently strong enough at this phase. An alternative embodiment would use a high density, gap filling adhesive or plastic, such as an epoxy, to hold the pieces in place. The advantages of this embodiment are the further minimization of machining and the use of the structural strength and properties of the adhesive itself. A third alternative is to combine the first two using an adhesive, such as an epoxy, to join threaded parts.

The lesser diameter reinforcing tubes are affixed in similar manner. Because of their placement in a basically triangular structural frame, they can be mounted directly to the structural tubes, or to the joints themselves. In one embodiment the reinforcing tube parallel to the head tube may be braced directly between the top tube and main tube in a bicycle frame.

The outer wrap or skin provides several important advantages. The use of resin impregnated fiber cloth or sheets permits the use of materials which are themselves extremely light, yet strong, such as carbon fiber. The medium of the resin impregnated sheet enables the constructor to conform the skin to relatively unusual shapes, such as compound curves or tubing joints with relative ease. This skin does itself have significant inherent structural strength. Indeed, as one alternative embodiment the entire internal structure could be etched away, leaving a reinforced plastic frame. The skin in either embodiment is a stress-bearing member.

A second function advantage provided by the outer skin is to control torsional stresses on the inner frame. Twisting, or forces substantially perpendicular to the longitudinal axis of the main tubes tend to flex or bend the structure. The outer skin further tends to counteract the bending or flexing motion of the structural tubing. Motion relative to each other is essentially eliminated. Lateral and torsional forces are also substantially redirected along the longitudinal axis where the overall structure has maximum strength.

The basic structural frame can, in the embodiment using multiple tubes along a single longitudinal axis, be further reinforced using spacer periodically spaced between the two or three reinforcing and main tube members.

Once the main structural frame has been fabricated, the invention contemplates the placement of an outer skin of resin impregnated, fiber reinforced sheet. The method for applying the outer skin is generally the same, whether the embodiment contemplates inoorporation of the substructure as a permanent structural member, or is to be etched in an acid bath, leaving a structure composed wholly of fiber reinforced, plastic resin.

Several important factors enter into the application of the outer skin. Although it is feasible to complete this step wholly manually, a turntable-type rotating platform greatly facilitates the application. It is desirable to have this jig, using upper and lower supports, rotate around a vertical axis. This will permit the operator to alternate hands, or move relative to the frame in order to maintain a constant speed of wrap relative to each structural section, yet avoid interference with the other structural sections as they rotate.

As has been mentioned, it is important to maintain a consistent speed of wrapping in order to maximize the strength of the fiber reinforced plastic. Use of a constant speed for the rotation of the turntable greatly facilitates this.

Another important factor is the maintainance of a consistent angle of wrap relative to the axis of each structural section. This is interrelated with the avoidance of buckling or folding where the fiber reinforced plastic is wrapped around and affixed to the structural sections, or prior affixed layers of wrap.

Another important factor in the invention is the use of a continuous length of fiber reinforced sheet. Although overlap may be made, say, in the center of a structural section, to facilitate sheet of limited lengths available from stock, the invention enables the continuous wrapping around joints, thereby greatly improving the strength of the joints. In certain instances a sheet may be split longitudinally to accommodate special joints involving compound angles, as in a bicycle frame. This splitting operation should not be necessary in a common space-frame construction as in an aircraft or motor vehicle application.

An added incidental advantage to the use of a rotating turntable is its usefulness in spray painting of a finished frame, to facilitate even paint coverage.

In the preferred embodiment, the turntable utilizes two adjusting, telescoping links which enable the rotation of the structural frame around an axis perpendicular to the axis of the turntable, thereby facilitating the placement of structural sections at different angles relative to each other at the axis of rotation, or nearly parallel to it, without removal from the turntable. This further facilitates the consistent application of the fiber reinforced plastic and particularly its continuous application around the junctions of the structural sections.

In accordance with my invention, I claim:

1. A method of constructing structural frameworks in which a rigid tubular sub-frame comprising a series of round cross-section tubes, in which the structural elements are comprised of a multiplicity of tubes, the main structural members comprising at least two parallel tubes of differing diameter, and the secondary structural members comprising at least two nearly parallel tubes, wherein said sub-frame provides for the application of resin impregnated fiber sheet by wrapping said sheet around the tubular, members of said subframe at an angle of less than 90° relative to the axis of said tubular member.

2. In a method as described in claim 1, said method utilizing the continuous application of said sheet around the junctions between said tubing.

3. In a method as described in claim 1, said method being followed by the etching or removal of the sub-frame.

* * * * *